United States Patent
Kim et al.

(10) Patent No.: US 9,418,794 B2
(45) Date of Patent: Aug. 16, 2016

(54) MEMS VARIABLE CAPACITOR

(75) Inventors: Chang Wook Kim, Seoul (KR); Dong Chan Park, Seoul (KR); Ju Young Song, Seoul (KR); Sang Hun Lee, Seoul (KR); Sung Bae Cho, Seoul (KR); Hyun Ho Yang, Daejeon (KR); Jun Bo Yoon, Daejeon (KR); Dong Hun Choi, Daejeon (KR); Chang Hun Han, Daejeon (KR)

(73) Assignees: LG INNOTEK CO., LTD., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 239 days.

(21) Appl. No.: 13/700,613

(22) PCT Filed: Jun. 1, 2011

(86) PCT No.: PCT/KR2011/003991
§ 371 (c)(1),
(2), (4) Date: Feb. 6, 2013

(87) PCT Pub. No.: WO2011/152653
PCT Pub. Date: Dec. 8, 2011

(65) Prior Publication Data
US 2013/0135785 A1    May 30, 2013

(30) Foreign Application Priority Data
Jun. 1, 2010 (KR) .......... 10-2010-0051958

(51) Int. Cl.
*H01G 5/01* (2006.01)
*H01G 7/00* (2006.01)
*H01G 7/06* (2006.01)
*H01G 5/16* (2006.01)

(52) U.S. Cl.
CPC ... *H01G 7/00* (2013.01); *H01G 5/16* (2013.01)

(58) Field of Classification Search
CPC .......... H01G 5/16; H01G 5/18; G01N 27/223
USPC ................. 361/277, 280, 281, 174, 274, 278; 200/181; 321/661
See application file for complete search history.

(56) References Cited

U.S. PATENT DOCUMENTS

| | | | |
|---|---|---|---|
| 6,242,989 B1 * | 6/2001 | Barber et al. | 331/177 V |
| 6,804,107 B2 | 10/2004 | Tuo et al. | |
| 8,039,922 B2 | 10/2011 | Ni | |
| 2008/0078662 A1 * | 4/2008 | Naito et al. | 200/181 |
| 2008/0265710 A1 * | 10/2008 | Ikehashi et al. | 310/309 |
| 2010/0116632 A1 * | 5/2010 | Smith | B81B 7/04 200/181 |

FOREIGN PATENT DOCUMENTS

| | | |
|---|---|---|
| JP | 2003-527746 A | 9/2003 |
| JP | 2010-045217 A | 2/2010 |
| KR | 10-2002-0085990 A | 11/2002 |

OTHER PUBLICATIONS

International Search Report in International Application No. PCT/KR2011/003991, filed Jun. 1, 2011.

* cited by examiner

*Primary Examiner* — Eric Thomas
*Assistant Examiner* — Arun Ramaswamy
(74) *Attorney, Agent, or Firm* — Saliwanchik, Lloyd & Eisenschenk

(57) ABSTRACT

Disclosed is a MEMS variable capacitor, the capacitor including a first electrode, a second electrode that is floated on an upper surface of the first electrode, and a third electrode capable of variably-adjusting a capacitance value by adjusting a gap between the first electrode and the second electrode.

7 Claims, 4 Drawing Sheets

(4a)

(4b)

(4c)

(5a)

(5b)

(6a)

(6b)

(6c)

MEMS VARIABLE CAPACITOR

CROSS-REFERENCE TO RELATED APPLICATIONS

This application is the U.S. national stage application of International Patent Application No. PCT/KR2011/003991, filed Jun. 1, 2011, which claims priority to Korean Application No. 10-2010-0051958, filed Jun. 1, 2010, the disclosures of each of which are incorporated herein by reference in their entirety.

TECHNICAL FIELD

The present invention relates to a MEMS (a micro-electromechanical system) variable capacitor.

BACKGROUND ART

A radio frequency (RF) block is designed to support many frequency bandwidths in a mobile communication system. In particular, a variable capacitor having a different capacitance for each frequency bandwidth should be used as a capacitor used in a filter having a direct relation to a frequency bandwidth. Furthermore, a voltage controlled oscillator (VCO), which is one element in an RF block, adjusts a voltage applied to a variable capacitor to vary the capacitance thereof, and changes a resonance frequency thereby. In this way, the variable capacitor is a very important device for a tunable filter or a VCO for the RF block.

DISCLOSURE OF INVENTION

Technical Problem

The present invention is directed to a solution capable of obtaining a consistent phase noise characteristic due to the fact that a capacitance variation rate has a linear characteristic in response to an applied voltage.

Technical problems to be solved by the present invention are not restricted to the above-mentioned description, and any other technical problems not mentioned so far will be clearly appreciated from the following description by skill in the art.

Solution to Problem

In order to achieve at least the above objects, in whole or in part, and in accordance with the purpose of the disclosure, as embodied and broadly described, there is provided a MEMS (micro-electromechanical system) variable capacitor in one general aspect of the present invention, the capacitor characterized by: a first electrode; a second electrode that is floated on the first electrode; and a fixed third electrode capable of variably-adjusting a capacitance value by adjusting a gap between the first electrode and the second electrode, where the second electrode is floated from the first electrode by spring structures, and an RF (radio frequency) signal is applied from the first electrode to the second electrode.

In a second general aspect of the present invention, there is provided a MEMS (micro-electromechanical system) variable capacitor, the capacitor characterized by: a first electrode; a second electrode discrete from the first electrode; a third electrode that is floated from the first electrode and the second electrode; fourth electrodes connected to the third electrode via spring structures; and fifth electrodes formed in opposition to the fourth electrodes for adjusting a gap between the first/second electrodes and the third electrode by applying a voltage to the fourth electrodes to thereby adjust a capacitance value.

In some exemplary embodiments of the present invention, the MEMS variable capacitor may further include a support structure supporting a partial area of the spring structures.

In some exemplary embodiments of the present invention, the spring structure, the support structure, the fourth electrodes and the fifth electrodes may be provided in one pair respectively, each of one pair of the spring structures is connected to a distal end of both lateral surfaces of the third electrode and to the one pair of fourth electrodes, where each partial area of the one pair of spring structures is supported by each one pair of support structures, and each of the fifth electrodes is in opposition to each of the fourth electrodes.

In some exemplary embodiments of the present invention, the third electrode may have a displacement soaring to the first electrode and the second electrode by a seesaw driving of the one pair of support structures if a voltage is applied from the fifth electrodes to the fourth electrodes.

In some exemplary embodiments of the present invention, the first electrode, the second electrode and the fifth electrodes may be fixed to a substrate.

Therefore, the MEMS variable capacitor according to the present invention is effective in that a voltage is applied from a separate electrode not applied with an RF signal to enable a capacitance adjustment.

The MEMS variable capacitor according to the present invention is further effective in that an RF signal is applied from the first electrode to the third electrode, and the RF signal is transmitted from the third electrode to the second electrode, where no RF signal flows to the mechanical spring structures supporting the floated third electrode to thereby obtain a high Q value.

The MEMS variable capacitor according to the present invention is still further effective in that capacitance variation has a linear characteristic to enable an obtainment of a consistent phase noise characteristic.

Advantageous Effects of Invention

The MEMS variable capacitor according to the present invention has an advantageous effect in that a voltage is applied from a separate electrode not applied with an RF signal to enable a capacitance adjustment.

The MEMS variable capacitor according to the present invention has another advantageous effect in that an RF signal is applied from the first electrode to the third electrode, and the RF signal is transmitted from the third electrode to the second electrode, where no RF signal flows to the mechanical spring structure supporting the floated third electrode to thereby obtain a high Q value.

The MEMS variable capacitor according to the present invention has still another advantageous effect in that capacitance variation has a linear characteristic to enable an obtainment of a consistent phase noise characteristic.

BRIEF DESCRIPTION OF DRAWINGS

Non-limiting exemplary embodiments of the present invention will be described in detail with reference to the accompanying drawings. Like reference numerals refer to like parts or portions throughout the description of several views of the drawings.

BEST MODE FOR CARRYING OUT THE INVENTION

The advantages, features and methods for achieving the foregoing will be apparent from the accompanying drawings and exemplary embodiments that follow.

Embodiments of the present invention are described below by way of example only. These examples represent the best ways of putting the invention into practice that are currently known to the Applicant although they are not the only ways in which this could be achieved.

This invention may be embodied in various forms and should not be construed as limited to the embodiments set forth herein. Rather, these embodiments are provided so that this disclosure will be thorough and complete, and will fully convey the scope of the invention to those skilled in the art.

Figure 1:
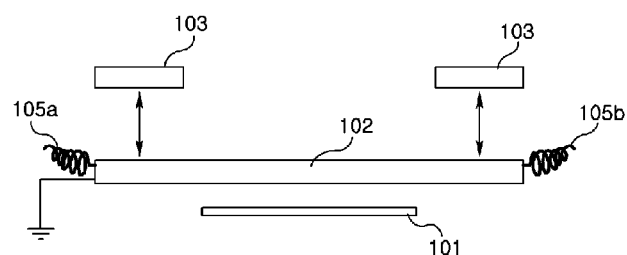
FIG. 1 is a schematic conceptual view illustrating a MEMS variable capacitor according to a first exemplary embodiment of the present invention.

FIG. 1 is a schematic conceptual view illustrating a MEMS variable capacitor according to a first exemplary embodiment of the present invention.

The MEMS (micro-electromechanical system) variable capacitor according to a first exemplary embodiment of the present invention is structured in such a manner that a second electrode (102) is floated on an upper surface of the first electrode (101), and voltage is applied to a fixed third electrode (103) to adjust a gap between the first and second electrodes (101, 102) and to change a capacitance value.

That is, the MEMS variable capacitor according to the first exemplary embodiment of the present invention may include a first electrode (101), a second electrode (102) that is floated on an upper surface of the first electrode (101); and a fixed third electrode (103) capable of variably-adjusting a capacitance value by adjusting a gap between the first electrode (101) and the second electrode (102), where the second electrode (102) is floated from the upper surface of the first electrode (101) by spring structures (105a, 105b), and an RF (radio frequency) signal is applied from the first electrode (101) to the second electrode (102).

Therefore, the gap adjustment between the first electrode (101) and the second electrode (102) in the first exemplary embodiment of the present invention is implemented by voltage application to the third electrode (103) and movement of the second electrode (102) toward the third electrode (103).

At this time, as the second electrode (102) approaches the third electrode (103), the second electrode (102) is gradually distanced from the first electrode (101). As a result, in a case the voltage applied to the third electrode (103) increases, the second electrode (102) gradually approaches the third electrode (103), and the second electrode (102) is gradually distanced from the first electrode (101) to gradually decrease the capacitance value. In short, the MEMS variable capacitor according to the first exemplary embodiment of the present invention is advantageous in that a voltage is applied from a separate electrode not applied with an RF signal to adjust the capacitance value.

Figure 2:
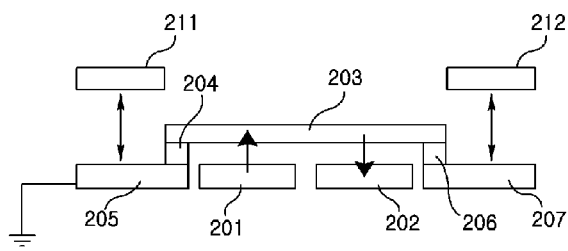
FIG. 2 is a schematic conceptual view illustrating a MEMS variable capacitor according to a second exemplary embodiment of the present invention.

FIG. 2 is a schematic conceptual view illustrating a MEMS variable capacitor according to a second exemplary embodiment of the present invention.

The MEMS variable capacitor according to the second exemplary embodiment of the present invention is structured in such a manner that a first electrode (201) and a second electrode (202) are fixed, a third electrode (203) is floated on an upper surface of the first and second electrodes, voltage is applied to fixed fifth electrodes (211, 212) to adjust a gap between the first/second electrodes (201, 202) and the third electrode (203) to thereby change a capacitance value.

In other words, the MEMS variable capacitor according to the second exemplary embodiment of the present invention may include a first electrode (201), a second electrode (202) discrete from the first electrode (201), a third electrode (203) that is floated from an upper surface of the first electrode and an upper surface of the second electrode, fourth electrodes (205, 207) connected to the third electrode (203) via spring structures (204, 206), and fifth electrodes (211, 212) formed in opposition to the fourth electrodes (205, 207) for adjusting a gap between the first/second electrodes (201, 202) and the third electrode (203) by applying a voltage to the fourth electrodes (205, 207) to thereby adjust a capacitance value.

As a result, in a case a voltage is applied to the fourth electrodes (205, 207) from the fifth electrodes (211, 212), the fourth electrodes (205, 207) move to the fifth electrodes (211, 212), where the third electrode (203) is distanced from the first/second electrodes (201, 202).

In short, in the second exemplary embodiment, the voltage is applied from the fifth electrodes (211, 212) which are separate electrodes that are not applied with an RF signal, and a gap between the first/second electrodes (201, 202) and the third electrode (203) is adjusted to change the capacitance value.

Furthermore, the MEMS variable capacitor according to the second exemplary embodiment of the present invention is advantageously structured in such a fashion that an RF signal is applied from the first electrode (201) to the third electrode (203), and the RF signal is transmitted from the third electrode (203) to the second electrode (202), such that the RF signal does not flow to the mechanical spring structures (204, 206) supporting the third electrode (203) to thereby obtain a high Q value.

Figure 3:
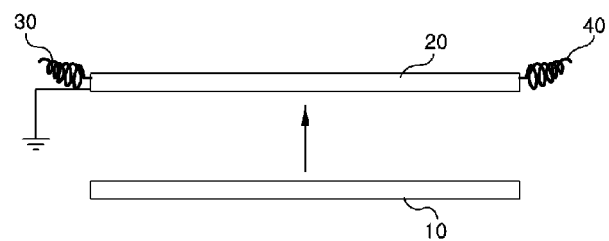
FIG. 3 is a schematic conceptual view illustrating a variable capacitor of a comparative example according to the present invention.
Figure 4:
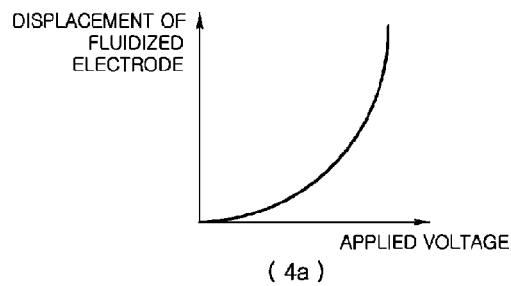
FIGS. 4a, 4b and 4c are graphs illustrating characteristic of a variable capacitor of a comparative example according to the present invention.
Figure 4:
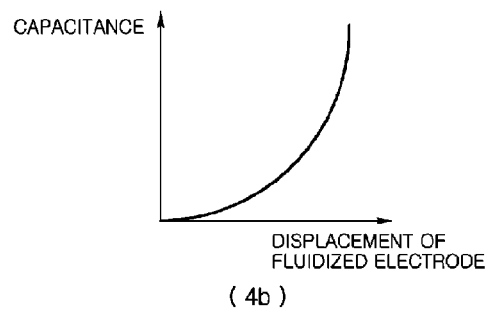
Figure 4:
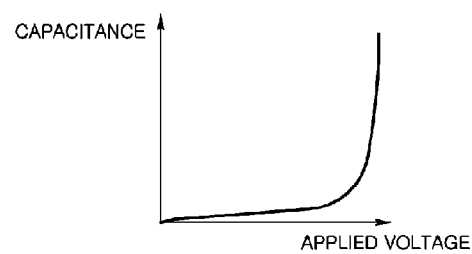

FIG. 3 is a schematic conceptual view illustrating a variable capacitor of a comparative example according to the present invention, and FIGS. 4a, 4b and 4c are graphs illustrating characteristic of a variable capacitor of a comparative example according to the present invention.

The conventional variable capacitor according to the comparative example of the present invention is such that first and second electrodes (10, 20) face each other, and in a case a voltage is applied to the first electrode (10), the second electrode (20) floated by mechanical springs (30, 40) is pulled down to adjust a gap between the first and second electrodes (10, 20), whereby a capacitance value is changed.

Therefore, as illustrated in the graph of FIG. 4a that shows the comparative example according to the present invention, displacement of the second electrode (20), which is a fluidized electrode, increases at a fast pace as the applied voltage increases at a constant level, and as illustrated in the graph of FIG. 4b, the capacitance variation increases at a fast pace as displacement of the fluidized electrode increases at a constant level, and as illustrated in the graph of FIG. 4c, capacitance variation increases at a fast pace as the applied voltage increases at a constant level.

As a result, the variable capacitor in the comparative example fails to obtain a consistent phase noise characteristic due to non-linear capacitance variation in response to the applied voltage, and it is difficult to control the abrupt capacitance variation near a maximum value of the applied voltage.

Figure 5:
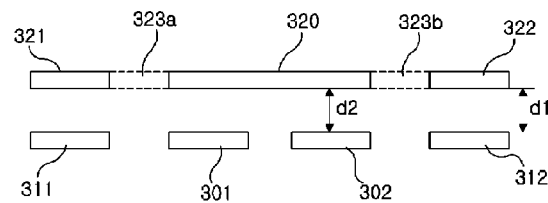
FIGS. 5a and 5b are schematic conceptual views illustrating a MEMS variable capacitor according to a third exemplary embodiment of the present invention.
Figure 5:
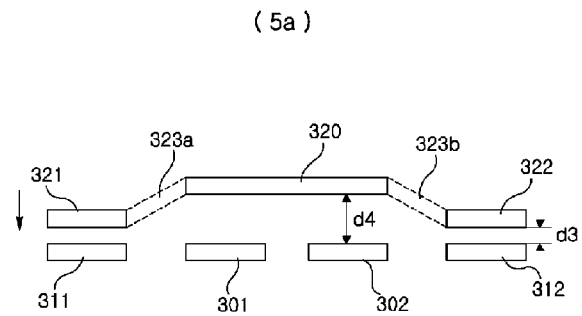
Figure 6:
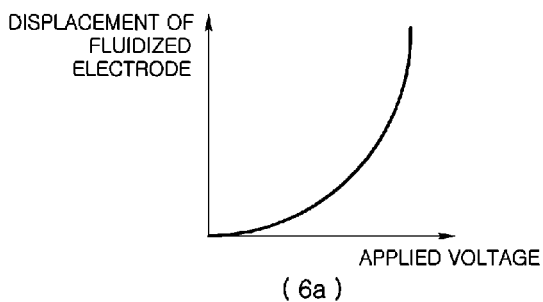
FIGS. 6a, 6b and 6c are graphs illustrating characteristic of a MEMS variable capacitor according to a third exemplary embodiment of the present invention.
Figure 6:
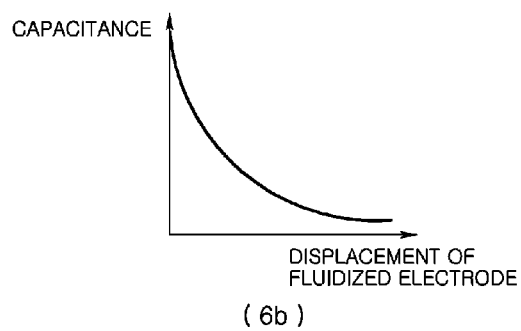
Figure 6:
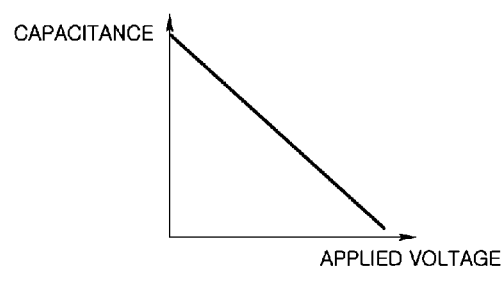

FIGS. 5a and 5b are schematic conceptual views illustrating a MEMS variable capacitor according to a third exemplary embodiment of the present invention, and FIGS. 6a, 6b and 6c are graphs illustrating characteristic of a MEMS variable capacitor according to a third exemplary embodiment of the present invention.

First, the MEMS variable capacitor according to the third exemplary embodiment of the present invention is such that a fluidized electrode floated in a seesaw structure is moved to adjust a gap between the fluidized electrode and a stationary electrode, whereby capacitance value can be changed.

That is, the MEMS variable capacitor according to the third exemplary embodiment of the present invention may include a first electrode (301), a second electrode (302) discrete from the first electrode (301), a third electrode (320) that is floated from an upper surface of the first electrode (301) and an upper surface of the second electrode (302), fourth electrodes (321, 322) connected to the third electrode (320) via spring structures (323a, 323b), fifth electrodes (311, 312) formed in opposition to the fourth electrodes (321, 322) for adjusting a gap between the first/second electrodes (301, 302) and the third electrode (320) by applying a voltage to the fourth electrodes (321, 322) to thereby adjust a capacitance value, and a support structure (not shown) fixing a partial area of the spring structures (323a, 323b).

The MEMS variable capacitor according to the third exemplary embodiment of the present invention is such that, in a case a voltage is applied from the fifth electrodes (311, 312) to the fourth electrodes (321, 322), as shown in FIG. 5a, the fourth electrodes (321, 322) move to the direction of the fifth electrodes (311, 312) as illustrated in FIG. 5b.

At this time, a partial area of the spring structures (323a, 323b) connecting the third electrode (320) to the fourth electrodes (321, 322) is fixed to the support structure, such that an area of the fourth electrodes (321, 322) gradually approaches the fifth electrodes (311, 312) about the partial area of the fixed spring structures (323a, 323b), while the third electrode (320) is gradually distanced from the first and second electrodes (301, 302).

That is, a gap between the first/second electrodes (301, 302) and the third electrode (320) increases from 'd2' prior to voltage application (FIG. 5a) to 'd4' posterior to voltage application (FIG. 5b).

Furthermore, a gap between the fourth electrodes (321, 322) and the fifth electrodes (311, 312) decreases from 'd1' prior to voltage application (FIG. 5a) to 'd3' posterior to voltage application (FIG. 5b).

Therefore, the MEMS variable capacitor according to the third exemplary embodiment of the present invention is such that a gap between the first/second electrodes (301, 302) and the third electrode (320) can be adjusted by the size of a voltage applied from the fifth electrodes (311, 312) to the fourth electrodes (321, 322), thereby implementing the capacitance variation.

Furthermore, the MEMS variable capacitor according to the third exemplary embodiment of the present invention is also advantageously structured in such a way that an RF signal is applied from the first electrode (301) to the third electrode (320), and the RF signal is transmitted from the third electrode (320) to the second electrode (302), such that the RF signal does not flow to the mechanical spring structures (323a, 323b) to thereby obtain a high Q value.

Still furthermore, the MEMS variable capacitor according to the third exemplary embodiment of the present invention is also advantageously structured in such a way that the voltage is applied from the fifth electrodes (311, 312) which are separate electrodes that are not applied with an RF signal, and a gap between the first/second electrodes (301, 302) and the third electrode (320) is adjusted to change the capacitance value.

Meanwhile, as illustrated in FIG. 6a, the MEMS variable capacitor according to the third exemplary embodiment of the present invention is such that displacement of the third electrode (320), which is a fluidized electrode, increases at a fast pace as the applied voltage increases at a constant level, as illustrated in FIG. 6a, but, as illustrated in FIG. 6b, the capacitance variation decreases at a fast pace as displacement of the fluidized electrode increases at a constant level. As a result, the MEMS variable capacitor according to the third exemplary embodiment of the present invention can obtain a characteristic in which the capacitance variation linearly decreases as the applied voltage increases at a constant level, as shown in FIG. 6c.

Therefore, the MEMS variable capacitor according to the third exemplary embodiment of the present invention is advantageous in that capacitance variation has a linear characteristic according to the applied voltage to enable an obtainment of a consistent phase noise characteristic, in comparison to the variable capacity in the comparative example.

MODE FOR THE INVENTION

Figure 7:
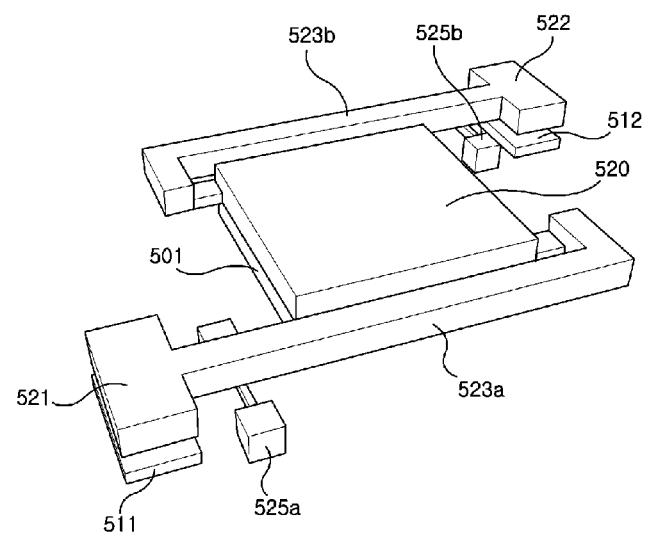
FIG. 7 is a schematic perspective view illustrating an example of a MEMS variable capacitor according to a third exemplary embodiment of the present invention.
Figure 8:
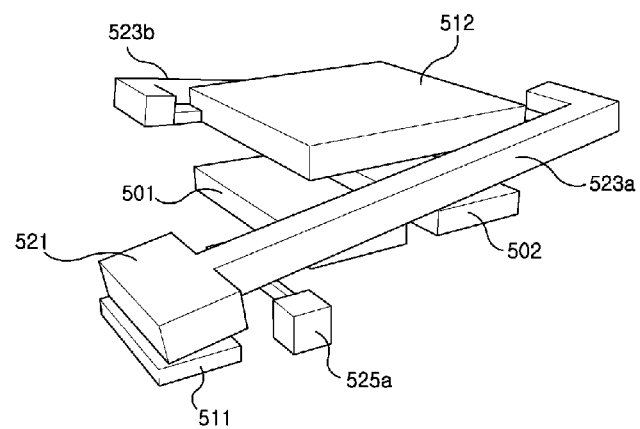
FIG. 8 is a schematic perspective view illustrating a capacitance being varied in the MEMS variable capacitor of FIG. 7.

FIG. 7 is a schematic perspective view illustrating an example of a MEMS variable capacitor according to a third exemplary embodiment of the present invention, and FIG. 8 is a schematic perspective view illustrating a capacitance being varied in the MEMS variable capacitor of FIG. 7.

The MEMS variable capacitor according to the third exemplary embodiment of the present invention is structured in such a manner that a third electrode (520) takes the shape of a square, and a pair of spring structures (523a, 523b) is symmetrically connected to a distal end at both sides of the third electrode (520).

Each of the pair of spring structures (523a, 523b) is connected to fourth electrodes (521, 522), and a partial area of each of the pair of spring structures (523a, 523b) is supported by support structures (525a, 525b).

Because the partial area of each of the pair of spring structures (523a, 523b) is supported by support structures (525a, 525b), the third electrode (520), the pair of spring structures (523a, 523b) and the fourth electrodes (521, 522) are in the state of floating.

Each of fifth electrodes (511, 512) symmetrically formed with each of the fourth electrodes (521, 522) is fixed, and the third electrode (520) is fixedly arranged thereunder with a first electrode (501) and a second electrode (502), where the term of 'fixed or fixedly' herein defines that an element is fixed to a substrate (not shown) for implementing the variable capacitor in the MEMS (micro-electromechanical system).

The first electrode (501), second electrode (502) and fifth electrodes are fixed to the substrate. Therefore, in a case a voltage is applied from the fifth electrodes (511, 512) to the fourth electrodes (521, 522), the third electrode (520) comes to have a displacement soaring to the upper surfaces of the first electrode (501) and the second electrode (502) by a seesaw driving, thereby increasing a gap between the first/second electrodes and the third electrode (520).

INDUSTRIAL APPLICABILITY

The MEMS variable capacitor according to the present invention has an industrial applicability in that a voltage is applied from a separate electrode not applied with an RF signal to enable a capacitance adjustment.

The MEMS variable capacitor according to the present invention has another industrial applicability in that an RF signal is applied from the first electrode to the third electrode, and the RF signal is transmitted from the third electrode to the second electrode, where no RF signal flows to the mechanical spring structure supporting the floated third electrode to thereby obtain a high Q value.

The MEMS variable capacitor according to the present invention has still another industrial applicability in that capacitance variation has a linear characteristic to enable an obtainment of a consistent phase noise characteristic.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

The invention claimed is:

1. A MEMS (micro-electromechanical system) variable capacitor, the capacitor characterized by: a first electrode;
    a second electrode that is floated on the first electrode; and
    a fixed third electrode configured to variably adjust a capacitance value of the MEMS variable capacitor, wherein when a voltage is applied to the third electrode, a distance between the first electrode and the second electrode is increased in response to the applied voltage; wherein the second electrode is vertically disposed between the first electrode and the third electrode, and wherein a radio frequency (RF) signal is transmitted from the third electrode to the second electrode.

2. The MEMS variable capacitor of claim 1, wherein the second electrode is floated from the first electrode by spring structures.

3. The MEMS variable capacitor of claim 1, wherein the RF signal is applied from the first electrode to the second electrode.

4. A MEMS (micro-electromechanical system) variable capacitor, the capacitor characterized by:
    a first electrode; a second electrode discrete from the first electrode;
    a third electrode that is floated on the first electrode and the second electrode;
    fourth electrodes connected to the third electrode via spring structures; and
    fifth electrodes formed in opposition to the fourth electrodes for adjusting a gap between the first/second electrodes and the third electrode by applying a voltage to the fourth electrodes to thereby adjust a capacitance value
    fifth electrodes formed in opposition to the fourth electrodes and configured to variably adjust a capacitance value of the MEMS variable capacitor, wherein when a voltage is applied to the fifth electrodes, a distance between the third electrode and the first/second electrodes is increased in response to the applied voltage;
    wherein the third electrode is vertically disposed between the fifth electrode and a collection of the first, second, and fourth electrodes.

5. The MEMS variable capacitor of claim 4, further including a support structure supporting a partial area of the spring structures.

6. The MEMS variable capacitor of claim 4, wherein the spring structures, support structures, the fourth electrodes and the fifth electrodes are provided in one pair respectively, each of one pair of the spring structures is connected to a distal end at both lateral surfaces of the third electrode and to the one pair of fourth electrodes, where each partial area of the one pair of spring structures is supported by each one pair of support structures, and each of the fifth electrodes is in opposition to each of the fourth electrodes.

7. The MEMS variable capacitor of claim 6, wherein the third electrode has a displacement soaring to the first electrode and the second electrode by a seesaw driving of the one pair of support structures if a voltage is applied from the fifth electrodes to the fourth electrodes.

* * * * *